United States Patent
van Buuren et al.

(10) Patent No.: US 6,942,890 B1
(45) Date of Patent: Sep. 13, 2005

(54) FORTIFICATION OF FOOD PRODUCTS WITH OLIVE FRUIT INGREDIENTS

(76) Inventors: Jan van Buuren, Unilever Research Vlaardingen, Olivier van Noortlaan 120, 3133 AT Vlaardingen (NL); Karel Petrus van Putte, Unilever Research Vlaardingen, Olivier van Noortlaan 120, 3133 AT Vlaardingen (NL); Nicolaas Overbeeke, Olivier van Noortlaan 120, Vlaardingen (NL)

(*) Notice: Subject to any disclaimer, the term of this patent is extended or adjusted under 35 U.S.C. 154(b) by 0 days.

(21) Appl. No.: 09/868,944

(22) PCT Filed: Dec. 6, 1999

(86) PCT No.: PCT/EP99/09571

§ 371 (c)(1),
(2), (4) Date: Sep. 24, 2001

(87) PCT Pub. No.: WO00/38541

PCT Pub. Date: Jul. 6, 2000

(30) Foreign Application Priority Data

Dec. 23, 1998 (EP) .............................. 98204441

(51) Int. Cl.[7] .............................. A23D 7/005
(52) U.S. Cl. .................. 426/601; 426/417; 426/602
(58) Field of Search ................. 426/601, 417, 426/602, 541, 542

(56) References Cited

U.S. PATENT DOCUMENTS

| | | | | |
|---|---|---|---|---|
| 5,585,130 A | * | 12/1996 | Aeschbach et al. | 426/542 |
| 6,162,480 A | * | 12/2000 | van Buuren et al. | 426/330.6 |
| 6,358,542 B2 | * | 3/2002 | Cuomo et al. | 424/777 |

FOREIGN PATENT DOCUMENTS

| | | | |
|---|---|---|---|
| EP | 0 811 678 | | 12/1997 |
| EP | 0 849 353 | | 12/1997 |
| EP | 0 933 419 | | 1/1999 |
| JP | 61015732 | | 1/1986 |
| WO | 97/06697 | | 2/1997 |
| WO | WO 97/28089 | * | 8/1997 |
| WO | 97/32947 | | 9/1997 |
| WO | 99/30724 | | 6/1999 |
| WO | WO 99/32589 | * | 7/1999 |
| WO | WO 99/53277 | * | 10/1999 |
| WO | WO 01/83654 | * | 11/2001 |

OTHER PUBLICATIONS

Litridou et al. 1997. J. Sci Food Agric 74:169–174.*
Gutfinger, T. 1981. JAOCS Nov. issue. p. 966–968.*
International Search Report.

* cited by examiner

Primary Examiner—Carolyn Paden

(57) ABSTRACT

Method of fortification of a food product with olive fruit ingredients, particularly phenolic compounds by adding solid matter derived from non-debittered olive fruit to the food product.

8 Claims, 1 Drawing Sheet

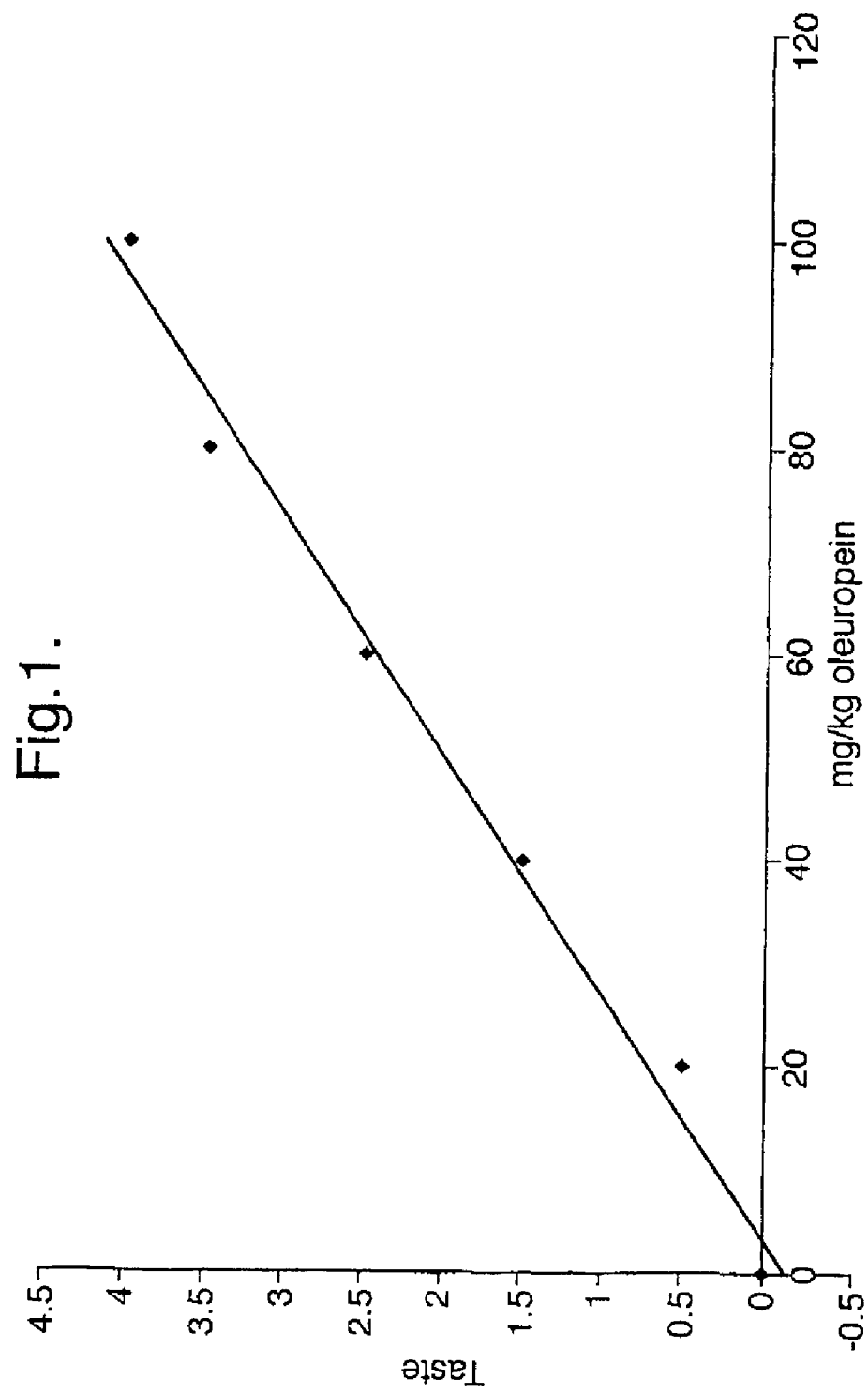

FORTIFICATION OF FOOD PRODUCTS WITH OLIVE FRUIT INGREDIENTS

The present invention relates to a method of fortifying food products with olive fruit ingredients. According to this method solid matter derived from olive fruit is added to food products, which results in an increase of the level of anti-oxidants, particularly of olive polyphenols.

BACKGROUND OF THE INVENTION

The incidence of cardiovascular diseases in a population is correlated with the occurrence of a high blood cholesterol content. The blood cholesterol level has been found to be decreased by a diet, which contains specific food components. For example, it is recommended to eat fats with a high content of unsaturated fatty acids.

It is known further that particularly diets which contain olive oil are healthy, because olive oil consumption contributes to a good balance of HDL cholesterol and LDL cholesterol in the blood. Recently it has been found that some minor fat components particularly the anti-oxidants, including polyphenols from fat, positively interfere with the body's cardiovascular system, particularly because they are believed to help control oxidation of blood cholesterol. Non-refined olive oil has a high content of phenolic compounds which often are denoted as phenolics, polyphenols or, specifically, as olive phenolics or as olive polyphenols Copending WO 99/32589 describes a useful application of said finding. The invention relates to spreads which contain olive oil as well as phenolic compounds. Traditionally for spread preparation an olive oil is employed which has been fully refined. The refining has removed together with the impurities also the beneficial phenolic compounds. Said patent application describes a refining process which is so mild that it delivers a purified oil from which undesired olive oil odour and most of the free fatty acids have been removed, but which still contains a considerable amount of healthy phenolic compounds.

The phenolics derived from olives form a group of chemical compounds, some of which have a relatively high oil solubility, the lipophilic olive phenolics, while others are more soluble in water, the hydrophilic olive phenolics. Only recently attention is given to the nutritional benefits of the hydrophilic polyphenols.

When olive oil is contacted with a water phase, e.g. during the usual water washing step, a partitioning of phenolic compounds occurs. A great part of the phenolic compounds is so hydrophilic that they easily migrate to the water phase, while the major part of the lipophilic phenolic compounds stay in the oil phase.

At least a part of the bitter taste of olive oil is ascribed to phenolic compounds. The lipophilic phenolic compounds which occur in the olive oil most contribute to the bitter taste.

In co-pending patent applications EP 849353 and EP 933419 olive oil processes are described, which aim at debittering the olive oil by removing and/or hydrolysing lipophilic phenolic compounds in olive oil. By hydrolysis the bitter lipophilic phenolic compounds are converted into the less bitter and more water soluble phenolic compounds. Since most of these migrate to the water phase of the olive oil/water mixture, they are removed when the separated water phase is discarded.

A characteristic sensoric property of many non-refined olive oils is astringency. The astringency is perceived as a non-pleasant feeling lingering in the back of the throat after some oil has been ingested. Excessive astringency, like excessive bitterness, spoils the taste of the oil. Astringency in olive oil appears to increase with its content of polyphenols.

WO 97/06697 teaches a healthy diet consisting of food products which have been fortified with high amounts of anti-oxidants, including phenolic compounds.

According to JP 59213368 (Derwent abstract) a tasty spread or cream is obtained by adding finely ground olives to food containing a fat-rich food ingredient. Because of the known astringent and bitter taste of olives, the olives are used only after a debittering treatment with sodium hydroxide solution.

It is known that after a sodium hydroxide treatment olives are substantially depleted with polyphenols. Therefore said process is not suited to enhance the content of phenolic compounds in a food product.

The aim of the present invention is to enhance the nutritional value of a food product by the addition of solid ingredients derived from olive fruits. Particularly vegetable oils, spreads, mayonnaises, salad dressings and sauces, in particular tomato sauces, may benefit from the invention. Particularly, the object of the present invention is to enrich food products with polyphenols from olive fruits.

SUMMARY OF THE INVENTION

It has been found that the solids of the olive fruit form a great resource of phenolic compounds. While the occurrence of those compounds in olive oil is about 200 ppm, in the water phase of olives it is 5000 ppm and in the solid remains even 10,000 ppm.

The invention is based on the finding that the solid matter of non-debittered olive fruits has appeared to be suited for enhancing the nutritional value of food products.

The aim of enhancing the nutritional value of a food product by fortification with useful olive fruit ingredients, is attained by incorporating into the food product solid matter derived from olives which solid matter has a particle size of 0.1 $\mu$m–5 mm, however, with the proviso that the used olives must not have been subjected to the usual debittering treatment.

Particularly, the invention provides a method to increase in food products the content of anti-oxidants, particularly the content of olive phenolics.

The invention further comprises a vegetable oil with a content of at least 180 ppm of olive phenolics, which oil comprises a dispersion of 0.05–0.5 wt. % of solid matter derived of olive fruit with a particle size of 0.1 $\mu$m–5 mm. At least 18 ppm of the olive phenolics is associated with said particles and is removed by filtration of the oil.

DESCRIPTION OF FIG

The graph of FIG. 1 shows the relation of standard solutions of bitter oleuropein in refined olive oil and bitterness score. In this way it is possible to assess bitterness by comparison the taste of an oil with the taste of oleuropein solutions.

DETAILS OF THE INVENTION

The present invention uses solid matter derived from olive fruits. Such matter is chosen from the group consisting of 1. particles obtained by diminuting unprocessed olives, 2. the solids which settle at the bottom of tanks in which the oil resulting from olives pressing is stored and 3. particles of the cake which remains after pressing the liquid phase from olives. Said solid matter contains high concentrations of olive phenolics.

Preferably the kernels are left out from the solid matter. Suited for the present invention is only solid matter obtained from olives which have not been subjected to a debittering treatment.

Preferably, the solid olive matter is added to the food product in an amount of 0.05–0.5 wt. %, preferably 0.1–0.3 wt. %.

Wt. % is calculated as dry weight on total food product.

The olive derived solid matter can be obtained by simply cutting harvested olives in pieces, or by other well known methods for chopping and diminuting olive fruits. A high shear mixer, such as an Ultra-turrax™ can be used for further reducing the size of the olive particles. Preferably, the particle size is such that the olive fruit solid matter does not settle when dispersed in a vegetable oil. The particle size suitably is in the range 0.1 $\mu$m–5 mm, preferably 0.1 $\mu$m–0.1 mm.

For obtaining a fortified food product which normally contains a vegetable oil, that oil can suitably be replaced by a vegetable oil enriched according to the present invention.

According to one embodiment of the invention the olive solid matter is simply added as an ingredient of the final food product.

According to another embodiment of the invention the olive derived solid matter is allowed to soak in vegetable oil for at least one minute and then the solid matter is separated from the oil. A part of the useful ingredients in the solid matter will dissolve during soaking and a part will remain associated with the solid particles.

Preferably, the soaking proceeds for at least 10 minutes, more preferably for at least one hour and even more preferably for at least one day. In a specific production process some trials will easily indicate which soaking time delivers the desired fortification. This separation embodiment is preferred only when a clear product is desired. Together with the solid matter also chose useful olive ingredients which are associated with chat solid matter are removed.

The temperature of the oil during soaking the solid matter is suitably kept at 30°–300° C. Relatively low temperatures are preferred. Soaking with a heated oil will accelerate the fortification process and also may increase the final concentration of the beneficial ingredients of the olive fruits which have migrated into the oil. The particles are removed preferably before the oil has cooled to ambient temperature. For removal one can use filtration, centrifugation or decantation.

The beneficial polyphenols known to be present in olive fruits are a mixture of different compounds which share the property of having one or more phenolic hydroxyl groups. The main polyphenols originating from olive fruit comprise oleuropein, aglycon, tyrosol and hydroxytyrosol.

The food products fortified according to the present invention contain at least 10 ppm, preferably at least 50 ppm, more preferably at least 200 ppm of olive originating polyphenols.

According to another aspect of the present invention it is also possible to start with a blend of different types of olive fruits. A proper choice enables the adjustment of levels and types of beneficial olive ingredients, as well as of the taste of the obtained food products.

Olives harvested in the begin phase of their ripening are at their maximum polyphenols content. Use of those olives can enhance still further the fortification with phenolic compounds. Use of green olives usually gives the best results. The olive fruits may be processed directly after harvesting. But it is also possible to freeze-dry the olives and store them for later processing.

The present invention also comprises novel vegetable oils characterized by the presence of 0.05–0.5 wt. % of olive derived solid matter and at least 180 ppm of olive phenolic compounds. The oils of the present invention are characterized further in that an amount of at least 18 ppm of those phenolic compounds is associated with the solid matter. Association means that removal, e.g. by filtration, of the solid matter from the oil lowers the overall content of phenolics in the oil associated with those solids.

The substantial increase of beneficial components from the olive fruits, particularly an increase of polyphenols, results into a change of various oil properties such as the oxidation stability of the oil. The Rancimat™ test is a common and simple standard test for establishing the induction time which is a measure for the oxidation stability of edible oil.

As will be shown in the examples and contrary to expectation, addition of solid matter of non-debittered olive fruits in the claimed amounts to food products hardly or not deteriorates the taste. Particularly fortified olive oil exhibits a mild and often fruity, but hardly bitter aftertaste. Astringency, which is expected because of the increased content of phenolic compounds, is hardly noticed or only at high levels of phenolics. In olive oils not only a deterioration of the taste of the oil fails to turn up, often even an improvement of the taste may result. Possibly, the surprising impact on flavour may be ascribed, at least partially, to absorption of off-flavour causing components to the added solid matter of the olive.

Bitterness of olive oil can be assessed by comparing with standard solutions of the phenolic compound oleuropein. The bitterness of a solution of oleuropein in refined olive oil increases proportionally with concentration. The graph of FIG. 1 shows the relation of concentration and bitterness score. A bitterness score of 3 and higher is quite normal for a common non-refined olive oil which contains 180 ppm of olive polyphenols. It is surprising that the bitterness score of the invented oils is less than 3, although they contain at least 180 ppm of olive oil polyphenols.

The bitterness score of a common non-refined olive oil 30 with a polyphenols content surpassing 300 ppm is at least 5.

The invention provides novel vegetable oils including olive oil which contain 0.05–0.5 wt. % of olive fruit derived solid matter, have a polyphenols concentration of at least 300 ppm, but, nevertheless, exhibit a bitterness score which is less than 5.

The invented method is suitable for fortifying vegetable oils such as rapeseed oil, sunflower seed oil, soybean oil, corn oil and, preferably, olive oil, which contain or not contain any amount of native polyphenols. Olive oil is comprised in all its quality grades: extra virgin olive oil, fine virgin olive oil, semi-fine or regular virgin olive oil, refined virgin olive oil, such as Lampante oil, olive residue oil and also olive oil blends, which contain virgin olive oil as well as refined olive oil. It should be noted that the solid olive matter to be used in the invention consists of natural olive ingredients.

It goes without saying that the invention also might be advantageous for the fortification of fat blends which partly consist of fat derived from animals or marine organisms.

The method of the invention is further applicable for the fortification of food products different from fat and oils, such as spreads, salad dressings, mayonnaise or a sauces.

In the present context spreads are understood to be food compositions which usually contain a substantial amount of fat emulsified with a water phase and which have a plastic consistency suitable for spreading on bread. Usually the fat phase consists of a liquid oil and a structuring fat which gives the spread its desired plastic consistency.

Sauces include any type of sauce, such as sauces that are ready to use and tomato sauces. Processes for the manufacture of spreads and sauces are well known in the art and need no illustration.

Although the present invention relates to methods which use solid matter of olive fruits which are non-debittered, for culinary purposes debittered olives may be used in addition when preparing the products covered by the present invention.

For establishing polyphenol concentrations in the products of the present patent specification the colorimetric Gutfinger method has been used. Since long the content of polyphenols in olive oils is established by this standard method. It is described in J. Am. Oil. Chem. Soc. 1981, 11, pp. 966–968. The measurement is based on the reaction of a methanolic extract of olive oil and the Folin-Ciocalteau reagent.

Unless specified otherwise, the weight percentages of the solid matter particles throughout this specification are calculated as dry weight on total food product.

In this specification the term fat comprises oil as well. The term oil is generally used when the fat is liquid at ambient temperature.

The invention is illustrated by the following examples.

General

Rancimat™ Test

Through the heated oil of which the oxidation stability is to be tested air is bubbled. The Rancimat™ value is the induction time, the maximum time during which no off-flavours can be smelled in the air which has passed through the oil.

EXAMPLE 1

Two types of Italian olives of which the kernel had been removed, were chopped by means of an Ultra-turrax™ until a particle size of 100 μm. The chopped olives were added to a French and to a Greek extra-virgin olive oil. After 24 hours of soaking the obtained turbid oils were assessed on taste. The polyphenol content and the induction time were measured. See Tables I–IV for results.

EXAMPLE 2

This example was carried out in the same way as example 1, with the exception that freeze dried olives were chopped before addition to the oil and chat small particles are compared with larger particles. From the figures in Tables V and VI it appears that a freeze drying treatment enhances the migration of phenolic compounds into the oil.

The same effect is obtained when smaller particles are used.

TABLE I

ITALIAN OLIVES TYPE 1 SOAKED IN FRENCH EXTRA VIRGIN OLIVE OIL

| olives added wt. % | pp ppm (1) | IT hours (2) | bitter score taste of the mixture |
|---|---|---|---|
| 0 (ref) | 158 | 7.12 | 2, mild and fruity |
| 0.4 | 175 | 6.13 | not assessed |
| 0.5 | 187 | 6.05 | 2, less fruity, little aftertaste |
| 0.67 | 235 | — | 2, bit fruity, mild aftertaste |

(1) PP = total polyphenol content (ppm)
(2) IT = induction time (hours)

TABLE II

ITALIAN OLIVES TYPE 2 IN FRENCH EXTRA VIRGIN OLIVE OIL

| olives added wt. % | PP ppm (1) | IT hours (2) | bitterness score taste of the mixture |
|---|---|---|---|
| 0 (ref.) | 158 | 7.12 | 2, mild and fruity |
| 0.4 | 186 | 7.20 | not assessed |
| 0.5 | 203 | 7.68 | 2, stronger taste, less fruity |

TABLE III

ITALIAN OLIVES TYPE 1
IN GREEK EXTRA VIRGIN OLIVE OIL

| olives added wt. % | PP ppm (1) | IT hours (2) | bitterness score taste of the mixture |
|---|---|---|---|
| 0 ref | 147 | 3.00 | 2, bit fruity, strong taste |
| 0.4 | 155 | 3.18 | not assessed |
| 0.5 | 183 | 3.82 | 2, not bitter, bit stronger |

(1) PP = total polyphenol content (ppm)
(2) IT = induction time (hours)

TABLE IV

ITALIAN OLIVES TYPE 2
IN GREEK EXTRA VIRGIN OLIVE OIL

| Olives added wt. % | PP (pp) (1) | IT hours (2) | Bitterness score, Taste of the mixture |
|---|---|---|---|
| 0 ref | 147 | 3.00 | 2, bit fruity strong taste |
| 0.4 | 153 | 3.15 | not assessed |
| 0.5 | 181 | 3.70 | 2, little astringency, little aftertaste |

(1) PP = total polyphenol content (ppm)
(2) IT = induction time (hours)

TABLE V

ITALIAN OLIVES TYPE 2
IN GREEK EXTRA VIRGIN OLIVE OIL

| olives added[1] | PP (ppm) | IT hours | bitterness score, taste of the mixture |
|---|---|---|---|
| 0 | 145 | 3.00 | 2, little aftertaste |
| 2.5 | 320 | 4.68 | 3, mild, bit fruity |

[1]Wt. % big particles, particle size approximately 1 mm.

TABLE VI

ITALIAN OLIVES TYPE 1
IN GREEK EXTRA VIRGIN OLIVE OIL

| olives added[2] | PP (ppm) | IT hours | bitterness score, taste of the mixture |
|---|---|---|---|
| 0 | 145 | 3.00 | 2, little aftertaste |
| 2.5 | 532 | 6.72 | 3, mild, not bitter |

[2]Wt. % small particles, size approximately 50 μm.

What is claimed is:

1. A method of fortifying a food product with phenolic compounds comprising incorporating into the food product solid matter derived from olives which have not been subjected to a debittering treatment, which solid matter has a particle size of 0.1 μm–5 mm, characterized in that the olives derived solid matter is added to the food product.

2. The method according to claim 1, whereby the solid matter is chosen from the group consisting of 1. Particles of unprocessed olive, 2. The solids which settle at the bottom of tanks in which the oil resulting from olives pressing is stored, and 3. Particles of the cake which remains after pressing the liquid phase from olives.

3. The method according to claim 1, whereby the obtained food product contains at least 10 ppm of olive derived phenolic compounds.

4. The method according to claim 1, whereby the food product is a vegetable oil.

5. A food product prepared with the oil obtainable by the method according to claim 4.

6. The method according to claim 1, whereby the olive solid matter is allowed to soak in the oil for at least one minute and then separating the solid from the oil.

7. The method according to claim 1, whereby the food product is chosen from a group consisting of a spread, a salad dressing, mayonnaise or a sauce.

8. A food product obtainable by the method according to claim 1.

* * * * *